(12) United States Patent
Boljanovic

(10) Patent No.: US 7,158,347 B2
(45) Date of Patent: Jan. 2, 2007

(54) GROUNDING CONNECTION BETWEEN SUSPENSION FLEXURE AND ARM ACTUATOR

(75) Inventor: Momo Boljanovic, Milipitas, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 371 days.

(21) Appl. No.: 10/900,562

(22) Filed: Jul. 27, 2004

(65) Prior Publication Data

US 2006/0023362 A1    Feb. 2, 2006

(51) Int. Cl.
*G11B 5/48* (2006.01)
(52) U.S. Cl. .................. 360/244.5; 360/266.1; 360/245.9; 360/265.9
(58) Field of Classification Search .............. None
See application file for complete search history.

(56) References Cited

U.S. PATENT DOCUMENTS

| 5,781,380 | A | * | 7/1998 | Berding et al. ........ 360/264.2 |
| 5,930,079 | A | * | 7/1999 | Vera et al. ............. 360/245.7 |
| 5,943,190 | A | * | 8/1999 | Fanslau, Jr. ............ 360/245.3 |
| 6,052,258 | A | * | 4/2000 | Albrecht et al. ........ 360/245.2 |
| 6,268,981 | B1 | * | 7/2001 | Coon et al. ............. 360/244.3 |
| 7,009,815 | B1 | * | 3/2006 | Hayakawa et al. ..... 360/264.2 |

* cited by examiner

*Primary Examiner*—R. S. Tupper
(74) *Attorney, Agent, or Firm*—Ben J. Yorks; Irell & Manella LLP

(57) ABSTRACT

An actuator arm assembly of a hard disk drive. The assembly includes a flexure that is attached to an actuator arm and a head coupled to the flexure. The head is coupled to a pre-amplifier circuit of the drive. The head is also electrically grounded through the flexure and the actuator arm. To improve the reliability of the ground path the flexure has a spring that is contact with a slot of the actuator arm. The spring provides a ground path from the head to the actuator arm.

23 Claims, 4 Drawing Sheets

GROUNDING CONNECTION BETWEEN SUSPENSION FLEXURE AND ARM ACTUATOR

BACKGROUND OF THE INVENTION

1. Field of the Invention

The present invention relates to an actuator arm assembly that grounds a head of a hard disk drive.

2. Background Information

Hard disk drives contain a plurality of magnetic heads that are coupled to rotating disks. The heads can magnetize and sense the magnetic fields of the disk to write and read data, respectively. The heads each have an air bearing surface that cooperates with a flow of air generated by the rotating disk to create an air bearing. The air bearing prevents mechanical wear between the head and the disk.

To facilitate formation of the air bearing the head is typically attached to a gimbal that pivots about a flexure arm. The flexure arm is cantilevered from the end of an actuator arm. The actuator arm has a voice coil motor that moves the heads across the surfaces of the disks.

The flexure arms are attached to the actuator arm by swagging the flexures into corresponding openings in the arm. The flexures may also have tabs that extend into corresponding slots of the actuator arm. The tabs are held in place with a non-conductive epoxy.

The output signals of the heads are amplified by a pre-amplifier circuit of the drive. The pre-amplifier circuit is connected to the heads by wires and/or flexible circuits that are attached to the flexures. The heads may be electrically grounded to the actuator arm through the flexures. The electrical path from the flexures to the actuator arm is limited to the area near the swage opening. It has been found that this area can be a relatively unreliable ground path resulting in a "floating" ground plane for the heads. A floating ground may degrade the performance of the drive.

BRIEF SUMMARY OF THE INVENTION

An actuator arm assembly of a hard disk drive that includes a flexure attached to an actuator arm, and a head coupled to the flexure. The flexure includes a spring that is in contact with a slot of the actuator arm. The head has an electrical connection with the actuator arm through the flexure spring.

DETAILED DESCRIPTION

Disclosed is an actuator arm assembly of a hard disk drive. The assembly includes a flexure that is attached to an actuator arm and a head coupled to the flexure. The head is coupled to a pre-amplifier circuit of the drive. The head is also electrically grounded through the flexure and the actuator arm. To improve the reliability of the ground path the flexure has a spring that is contact with a slot of the actuator arm. The spring provides a ground path from the head to the actuator arm.

Figure 1:
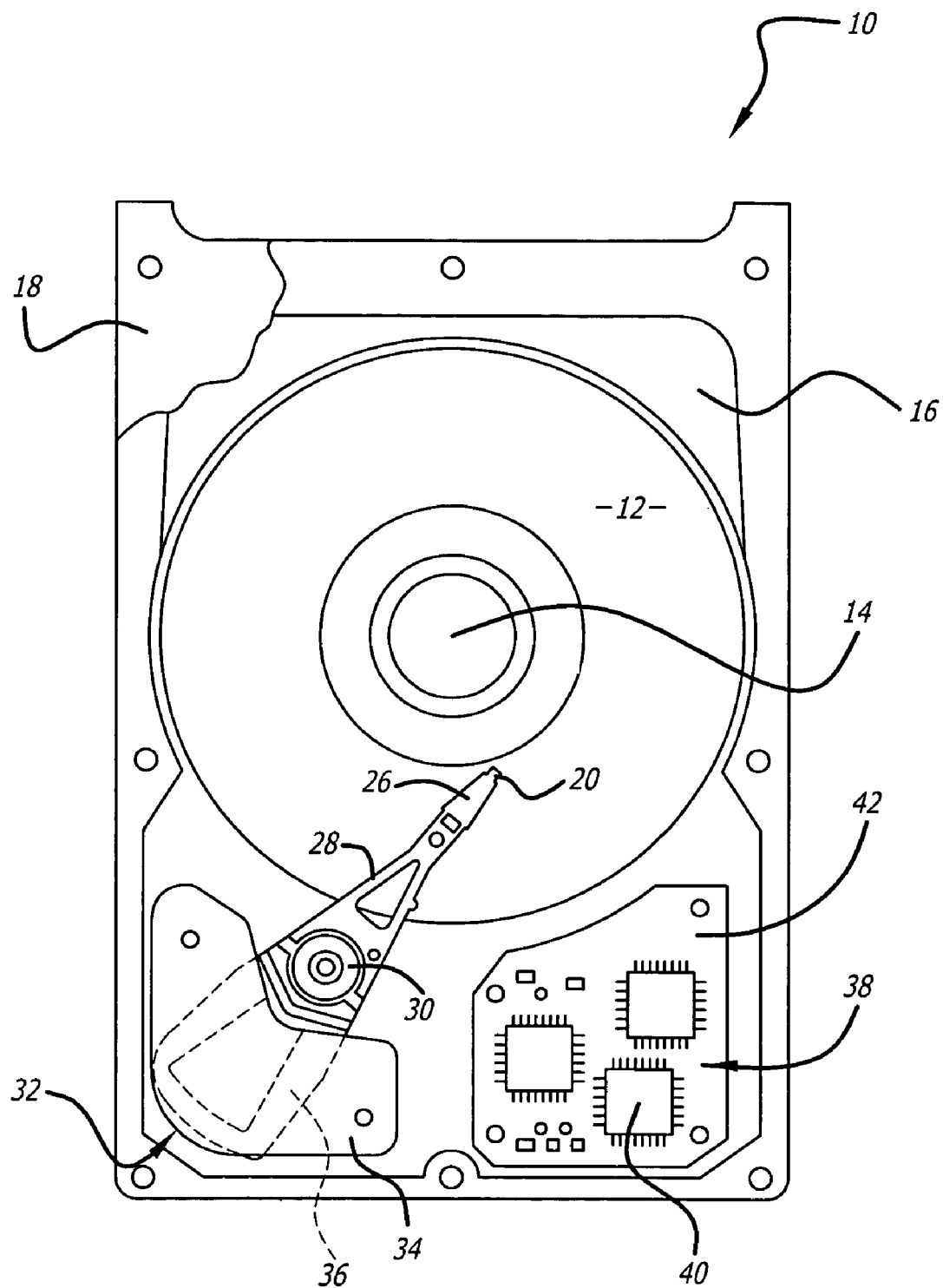
FIG. 1 is a top view of an embodiment of a hard disk drive.

Referring to the drawings more particularly by reference numbers, FIG. 1 shows an embodiment of a hard disk drive 10 of the present invention. The disk drive 10 may include one or more magnetic disks 12 that are rotated by a spindle motor 14. The spindle motor 14 may be mounted to a base plate 16. The disk drive 10 may further have a cover 18 that encloses the disks 12.

The disk drive 10 may include a plurality of heads 20 located adjacent to the disks 12. Each head 20 may have separate write (not shown) and read elements (not shown). The heads 20 are gimbal mounted to a corresponding flexure arm 26. The flexure arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes a plurality of integrated circuits 40 coupled to a printed circuit board 42. The printed circuit board 42 is coupled to the voice coil 32, heads 20 and spindle motor 14.

Figure 2:
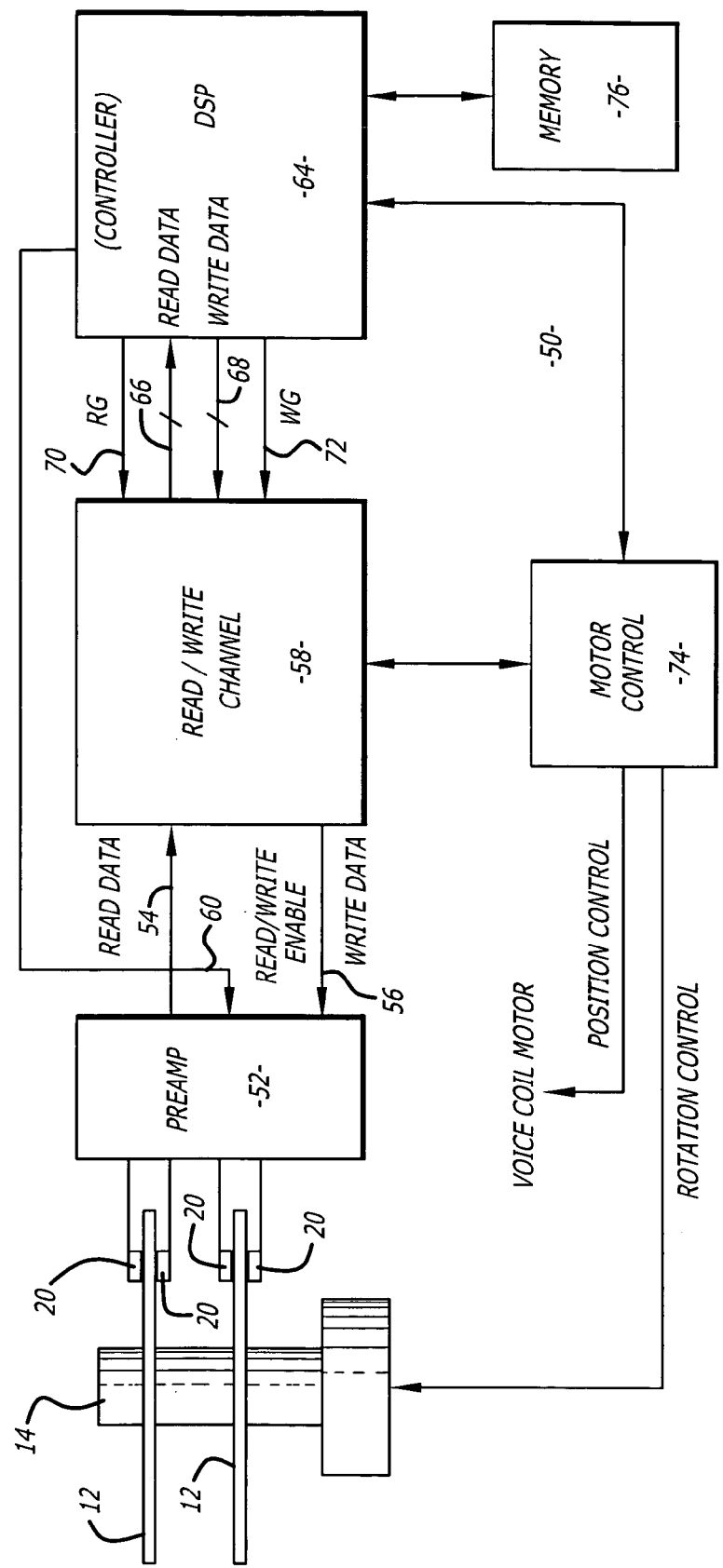
FIG. 2 is a schematic of an electrical circuit for the hard disk drive.

FIG. 2 shows an electrical circuit 50 for reading and writing data onto the disks 12. The circuit 50 may include a pre-amplifier circuit 52 that is coupled to the heads 20. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 58 is connected to a controller 64 through read and write channels 66 and 68, respectively, and read and write gates 70 and 72, respectively. The read gate 70 is enabled when data is to be read from the disks 12. The write gate 72 is to be enabled when writing data to the disks 12. The controller 64 may be a digital signal processor that operates in accordance with a firmware and/or software routine(s), including a routine(s) to write and read data from the disks 12. The read/write channel circuit 58 and controller 64 may also be connected to a motor control circuit 74 which controls the voice coil motor 36 and spindle motor 14 of the disk drive 10. The controller 64 may be connected to a non-volatile memory device 76. By way of example, the device 76 may be a read only memory ("ROM"). The non-volatile memory 76 may contain the firmware and/or software routine(s) performed by the controller.

Figure 3:
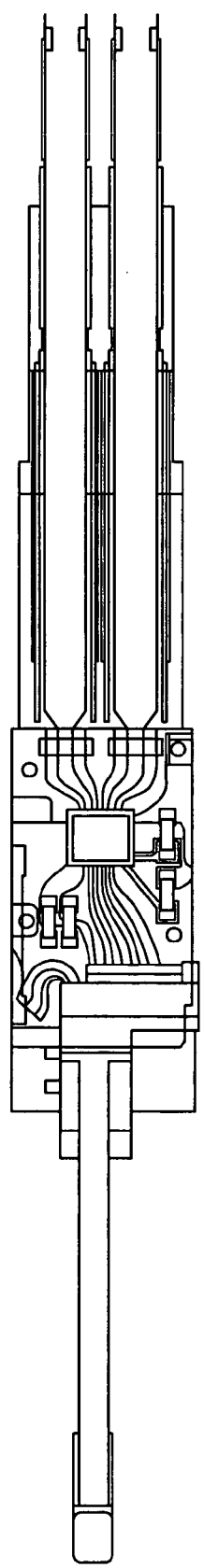
FIG. 3 is a top view showing an actuator arm assembly.
Figure 4:
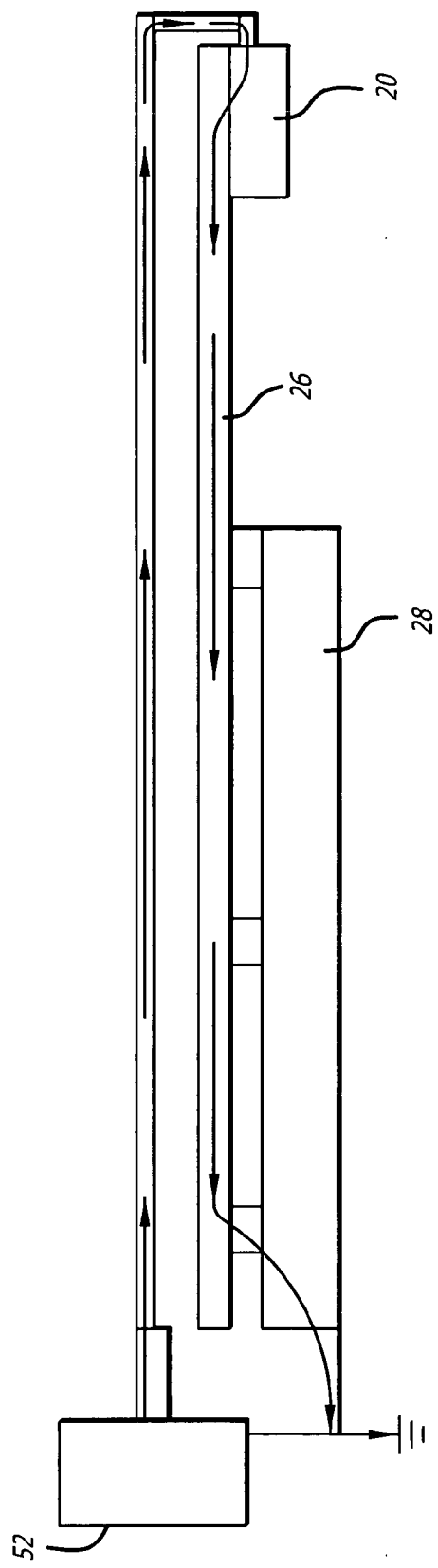
FIG. 4 is an illustration showing a ground path for a head of the disk drive.

FIG. 3 shows an embodiment of an actuator arm assembly. The assembly includes a flexure 26 attached to an actuator arm 28. The flexure 26 may be swaged to the arm 28 through a swage opening 100. The assembly may also include a flexible circuit board 102 that extends across the flexure 26 and electrically couples the head 20 to the pre-amplifier (not shown). Although a flexible circuit is shown, individual wires may extend across the flexure and be connected to the head. As shown in FIG. 4, the head 20 is electrically grounded to the flexure 26. The flexure 26 is electrically grounded to the actuator arm 28 and the base plate of the drive. The flexure 26 is typically constructed from an electrically conductive material such as stainless steel.

Figure 5:
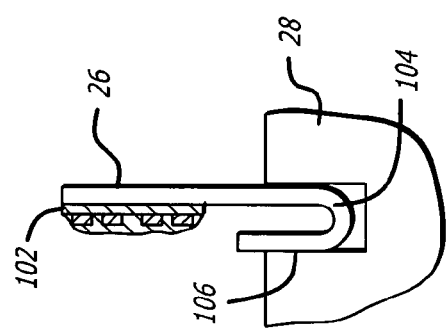
FIG. 5 is an enlarged side view showing a spring of a flexure within a slot of an actuator arm.

As shown in FIG. 5, the flexure 26 has one or more springs 104 that are in contact with corresponding slots 106 of the actuator arm 28. In one embodiment the springs 104 are tabs formed by bending an edge tab portion of the flexure 180 degrees. The springs 104 provide an electrical path between the flexure 26 and the actuator arm 28. The bent tabs exert a spring force that reduces the contact resistance between the flexure 26 and the actuator arm 28, and improves the reliability of the ground path from the head 20 to the arm 28.

The actuator arm assembly can be assembled by inserting the springs 104 into the actuator arm slots 106 and then swaging the flexure 26 to the actuator arm 28. The head 20 and flexible circuit 104 are typically attached to the flexure 26 before assembly to the actuator arm 28.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:
   a base plate;
   a spindle motor coupled to said base plate;
   a disk coupled to said spindle motor;
   an actuator arm coupled to said base plate, said actuator arm having a slot;
   a flexure attached to said actuator arm, said flexure having a spring in contact with said slot of said actuator arm;
   a circuit attached to said flexure;
   a head coupled to said flexure and said disk, said head having an electrical connection with said actuator arm through said flexure spring; and,
   a pre-amplifier circuit coupled to said head by said circuit.

2. The disk drive of claim 1, wherein said flexure spring includes a tab.

3. The disk drive of claim 2, wherein said tab is bent 180 degrees.

4. The disk drive of claim 1, wherein said spring exerts a spring force onto said actuator arm slot.

5. The disk drive of claim 1, wherein said flexure is constructed from steel.

6. A hard disk drive, comprising:
   a base plate;
   a spindle motor coupled to said base plate;
   a disk coupled to said spindle motor;
   an actuator arm coupled to said base plate, said actuator arm having a slot;
   a flexure attached to said actuator arm, said flexure having spring means for creating an electrical contact with said actuator arm slot;
   a circuit attached to said flexure;
   a head coupled to said flexure and said disk, said head having an electrical connection with said actuator arm through said spring means; and,
   a pre-amplifier circuit coupled to said head by said circuit.

7. The disk drive of claim 6, wherein said spring means includes a tab.

8. The disk drive of claim 7, wherein said tab is bent 180 degrees.

9. The disk drive of claim 6, wherein said spring means exerts a spring force onto said actuator arm slot.

10. The disk drive of claim 6, wherein said flexure is constructed from steel.

11. A method for assembling an actuator arm assembly, comprising:
    inserting a spring of a flexure into a slot of an actuator arm; and,
    attaching said flexure to said actuator arm.

12. The method of claim 11, further comprising attaching a circuit to said flexure and coupling a head to said flexure and said circuit.

13. The method of claim 12, further comprising coupling a pre-amplifier to said circuit.

14. An actuator arm assembly, comprising:
    an actuator arm coupled to a base plate, said actuator arm having a slot;
    a flexure attached to said actuator arm, said flexure having a spring in contact with said slot of said actuator arm;
    a circuit attached to said flexure; and,
    a head coupled to said flexure and having an electrical connection with said actuator arm through said flexure spring.

15. The assembly of claim 14, wherein said flexure spring includes a tab.

16. The assembly of claim 15, wherein said tab is bent 180 degrees.

17. The assembly of claim 14, wherein said spring exerts a spring force onto said actuator arm slot.

18. The assembly of claim 14, wherein said flexure is constructed from steel.

19. An actuator arm assembly, comprising:
    an actuator arm coupled to a base plate, said actuator arm having a slot;
    a flexure attached to said actuator arm, said flexure having spring means for creating an electrical contact with said actuator arm slot;
    a circuit attached to said flexure; and,
    a head coupled to said flexure and said disk, said head having an electrical connection with said actuator arm through said spring means.

20. The assembly of claim 19, wherein said spring means includes a tab.

21. The assembly of claim 20, wherein said tab is bent 180 degrees.

22. The assembly of claim 19, wherein said spring means exerts a spring force onto said actuator arm slot.

23. The assembly of claim 19, wherein said flexure is constructed from steel.

* * * * *